US012555510B2

(12) United States Patent
Lee

(10) Patent No.: US 12,555,510 B2
(45) Date of Patent: Feb. 17, 2026

(54) DISPLAY DEVICE

(71) Applicant: Samsung Display Co., LTD., Yongin-si (KR)

(72) Inventor: Yo Han Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/792,477

(22) Filed: Aug. 1, 2024

(65) Prior Publication Data

US 2025/0078713 A1 Mar. 6, 2025

(30) Foreign Application Priority Data

Aug. 28, 2023 (KR) ........................ 10-2023-0113169

(51) Int. Cl.
*G09G 3/20* (2006.01)
*G09G 3/32* (2016.01)
(Continued)

(52) U.S. Cl.
CPC ......... *G09G 3/2025* (2013.01); *G09G 3/2022* (2013.01); *G09G 3/32* (2013.01); *G09G 3/3275* (2013.01); *G09G 3/006* (2013.01); *G09G 2300/0852* (2013.01); *G09G 2310/027* (2013.01); *G09G 2310/08* (2013.01); *G09G 2320/0214* (2013.01); *G09G 2320/0242* (2013.01); *G09G 2320/045* (2013.01)

(58) Field of Classification Search
CPC ...... G09G 3/2025; G09G 3/2022; G09G 3/32; G09G 3/3275; G09G 3/006; G09G 2300/0852; G09G 2310/027; G09G 2310/08; G09G 2320/0214; G09G 2320/0242; G09G 2320/045
See application file for complete search history.

(56) References Cited

U.S. PATENT DOCUMENTS

| | | | |
|---|---|---|---|
| 9,430,966 | B2 | 8/2016 | Lee et al. |
| 11,403,997 | B2 | 8/2022 | Kwag et al. |

(Continued)

FOREIGN PATENT DOCUMENTS

| | | | |
|---|---|---|---|
| EP | 3866151 | A1 | 8/2021 |
| JP | 2021-076791 | A | 5/2021 |

(Continued)

*Primary Examiner* — Michael A Faragalla
(74) *Attorney, Agent, or Firm* — Womble Bond Dickinson (US) LLP

(57) ABSTRACT

A display device includes a pixel including a light-emitting element, and a data driver configured to sequentially provide first and second data signals to the pixel in a frame period including a first period and a second period, wherein the pixel is configured to emit light during the first period based on the first data signal, and to emit light during the second period based on the second data signal, wherein, when a grayscale value for the pixel is greater than a reference grayscale value, the pixel is configured to equally emit light in the first period and the second period, and wherein, when the grayscale value is less than or equal to the reference grayscale value, the pixel is configured to emit light differently in the first period compared to the second period, or to emit light in the first period while not emitting light in the second period.

16 Claims, 9 Drawing Sheets

(51) Int. Cl.
*G09G 3/3275* (2016.01)
*G09G 3/00* (2006.01)

(56) References Cited

U.S. PATENT DOCUMENTS

| | | | |
|---|---|---|---|
| 11,488,520 B2 | 11/2022 | Lee et al. | |
| 2020/0312240 A1* | 10/2020 | Lhee .................... | G09G 3/3648 |
| 2021/0242381 A1 | 8/2021 | Lee et al. | |
| 2023/0361262 A1 | 11/2023 | Cho et al. | |

FOREIGN PATENT DOCUMENTS

| | | |
|---|---|---|
| KR | 10-2036709 B1 | 10/2019 |
| KR | 10-2021-0098313 A | 8/2021 |
| KR | 10-2568250 B1 | 8/2023 |
| KR | 10-2568713 B1 | 8/2023 |
| KR | 10-2023-0155635 A | 11/2023 |

* cited by examiner

DISPLAY DEVICE

CROSS-REFERENCE TO RELATED APPLICATION

The present application claims priority to, and the benefit of, Korean patent application No. 10-2023-0113169, filed on Aug. 28, 2023, in the Korean Intellectual Property Office, the entire disclosure of which is incorporated herein by reference.

BACKGROUND

1. Field

The present disclosure generally relates to display device.

2. Description of Related Art

A display device includes at least one pixel, and the pixel includes a light-emitting element and a driving transistor. The display device may control a driving current flowing through the light-emitting element, using the driving transistor, thereby expressing a grayscale.

Due to dispersion of the driving current flowing through the light-emitting element, due to a leakage current, and the like, a low grayscale corresponding to the driving current having a low intensity may not be accurately expressed. In addition, the color (or wavelength) of light emitted from the light-emitting element may be shifted as the magnitude of the driving current is large or small, and a desired color may not be accurately expressed in a low grayscale area.

SUMMARY

Embodiments provide a display device capable of accurately expressing a low grayscale.

In accordance with an aspect of the present disclosure, there is provided a display device including a pixel including a light-emitting element, and a data driver configured to sequentially provide a first data signal and a second data signal to the pixel in a frame period including a first period and a second period, wherein the pixel is configured to emit light during the first period based on the first data signal, and to emit light during the second period based on the second data signal, wherein, when a grayscale value for the pixel is greater than a reference grayscale value, the pixel is configured to equally emit light in the first period and the second period, and wherein, when the grayscale value is less than or equal to the reference grayscale value, the pixel is configured to emit light differently in the first period compared to the second period, or to emit light in the first period while not emitting light in the second period.

The display device may further include a controller configured to generate a first data value and a second data value based on the grayscale value of frame data, wherein the data driver is configured to generate the first data signal based on the first data value, and to generate the second data signal based on the second data value.

When the grayscale value is greater than the reference grayscale value, each of the first data value and the second data value may be equal to the grayscale value, wherein, when the grayscale value is less than or equal to the reference grayscale value, the first data value is greater than the grayscale value, and the second data value is less than the grayscale value.

When the grayscale value is less than or equal to the reference grayscale value, the pixel may be configured to emit light with a luminance that is higher than a target luminance corresponding to the grayscale value in the first period, while not emitting light in the second period.

When the grayscale value is less than or equal to the reference grayscale value, the pixel may be configured to emit light with a luminance in the second period that is lower than a luminance in the first period.

A width of the first period may be equal to a width of the second period.

A width of the second period may be greater than a width of the first period.

The data driver may be configured to provide the first data signal to the pixel at a start time of the first period, and to provide the second data signal to the pixel at a start time of the second period.

The pixel may further include a first transistor including a first electrode electrically connected to a first power line, and a second electrode electrically connected to the light-emitting element, a second transistor electrically connected between a data line and a gate electrode of the first transistor, and including a gate electrode connected to a first scan line, and a first capacitor electrically connected between the gate electrode of the first transistor and the second electrode of the first transistor, wherein the first data signal and the second data signal are applied to the data line.

The pixel may further include a third transistor electrically connected between a readout line and the second electrode of the first transistor.

The light-emitting element may be electrically connected between the first transistor and a second power line, wherein the pixel further includes a sixth transistor electrically connected between the gate electrode of the first transistor and the second power line, a fourth transistor electrically connected between the data line and an intermediate node, and including a gate electrode electrically connected to a second scan line, a fifth transistor electrically connected between the intermediate node and a gate electrode of the sixth transistor, and including a gate electrode electrically connected to a third scan line, and a second capacitor electrically connected between the intermediate node and the second power line, and wherein the first scan line, the second scan line, and the third scan line are different from one another.

The display device may further include a gate driver connected to the first scan line, the second scan line, and the third scan line, configured to apply a first scan signal having a turn-on voltage level to the first scan line, and a second scan signal having the turn-on voltage level to the second scan line, in the first period, and configured to apply a third scan signal having the turn-on voltage level to the third scan line in the second period, wherein the data driver is configured to provide the first data signal to the pixel at a time corresponding to the first scan signal, and to provide the second data signal to the pixel at a time corresponding to the second scan signal.

The third scan signal having the turn-on voltage level may be applied during an entirety of the second period.

When the grayscale value is greater than the reference grayscale value, the second data signal may have a gate-off voltage level, wherein, when the grayscale value is less than or equal to the reference grayscale value, the second data signal has the turn-on voltage level.

When the grayscale value is less than or equal to the reference grayscale value, the pixel may be configured not to emit light in the second period.

The grayscale value may be within a range of a minimum grayscale value to a maximum grayscale value, wherein the reference grayscale value is greater than about 1/10$^{th}$ of the maximum grayscale value and is less than or equal to about ½ of the maximum grayscale value.

In accordance with another aspect of the present disclosure, there is provided a display device including a pixel, wherein the pixel includes a light-emitting element electrically connected between a first power line and a second power line, a first transistor including a first electrode electrically connected to the first power line, and a second electrode electrically connected to the light-emitting element, a second transistor electrically connected between a data line and a gate electrode of the first transistor, and including a gate electrode electrically connected to a first scan line, a first capacitor electrically connected between the gate electrode of the first transistor and the second electrode of the first transistor, a sixth transistor electrically connected between the gate electrode of the first transistor and the second power line, a fourth transistor electrically connected between the data line and an intermediate node, and including a gate electrode electrically connected to a second scan line, a fifth transistor electrically connected between the intermediate node and a gate electrode of the sixth transistor, and including a gate electrode electrically connected to a third scan line, and a second capacitor electrically connected between the intermediate node and the second power line.

The pixel may further include a third transistor electrically connected between a readout line and the second electrode of the first transistor.

The display device may further include a data driver connected to the data line, and a gate driver connected to the first scan line, the second scan line, and the third scan line, wherein a frame period includes a first period and a second period, wherein the gate driver is configured to apply a first scan signal having a turn-on voltage level to the first scan line, and a second scan signal having the turn-on voltage level to the second scan line, in the first period, and is configured to apply a third scan signal having the turn-on voltage level to the third scan line during the second period, and wherein the data driver is configured to apply a first data signal to the pixel through the data line at a time corresponding to the first scan signal, and to apply a second data signal that is different from the first data signal to the pixel through the data line at a time corresponding to the second scan signal.

The first data signal may be configured to vary according to a grayscale value for the pixel, wherein, when the grayscale value is greater than a reference grayscale value, the second data signal has a gate-off voltage level at which a transistor is turned off, and wherein, when the grayscale value is less than or equal to the reference grayscale value, the second data signal has the turn-on voltage level.

BRIEF DESCRIPTION OF DRAWINGS

Embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
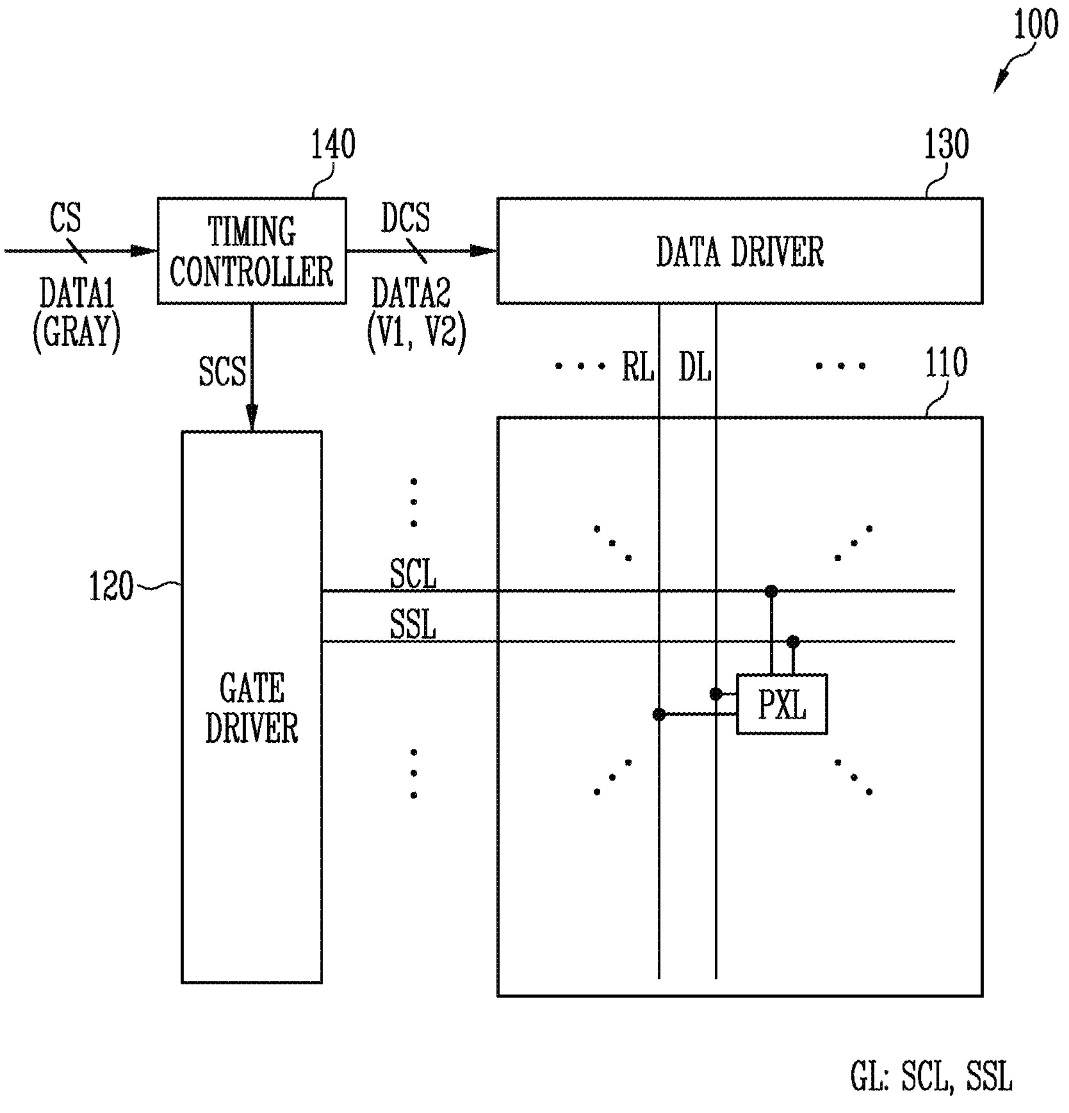
FIG. 1 is a block diagram illustrating a display device in accordance with embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

For the purposes of this disclosure, expressions, such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions, such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram illustrating a display device in accordance with embodiments of the present disclosure.

Referring to FIG. 1, the display device 100 (or a display panel) is a device for displaying images, and may be used as a display screen of not only portable electronic devices, such as a mobile phone, a smart phone, a tablet personal computer (PC), a smart watch, a watch phone, a mobile communication terminal, an electronic notebook, an electronic book, a portable multimedia player (PMP), a navigation system, and an ultra-mobile PC, but also may be used as various products, such as a television, a notebook computer, a monitor, an advertisement board, and Internet of things (IoT).

The display device 100 may include a display 110 (or display unit, or display panel), a gate driver 120 (or scan driver), a data driver 130 (or source driver), and a timing controller 140 (or controller or data processor).

The display 110 may display images. The display 110 may include a gate line GL, a data line DL, a readout line RL (or sensing line), and a pixel PXL (or sub-pixel). The gate line GL may include a scan line SCL (or first gate line) and a sensing scan line SSL (or second gate line). Each of the scan line SCL, the sensing scan line SSL, the data line DL, the readout line RL, and the pixel PXL may be provided in plurality.

The pixel PXL may include a light-emitting element, and may be located in an area (e.g., a pixel area) defined by the scan line SCL and the data line DL.

The pixel PXL may be connected to the scan line SCL, the sensing scan line SSL, the data line DL, and the readout line RL.

The pixel PXL may be initialized using an initialization voltage provided through the readout line RL in response to a sensing scan signal provided through the sensing scan line SSL, may store or record a data signal (or data voltage) provided through the data line DL in response to a scan signal provided through the scan line SCL, and may emit light with a luminance corresponding to the stored data signal. A specific configuration of the pixel PXL will be described later with reference to FIGS. 2 and 8.

The gate driver 120 may generate a scan signal based on a scan control signal SCS (or gate control signal), and may provide the generated scan signal to the scan line SCL. The scan control signal SCS may include a start signal, clock signals, and the like, and may be provided to the gate driver 120 from the timing controller 140. For example, the gate driver 120 may be implemented as a shift register for outputting a scan signal by shifting the start signal in a pulse form by using the clock signals. Also, similarly to a method of generating the scan signal, the gate driver 120 may generate a sensing scan signal, and may provide the generated sensing scan signal to the sensing scan line SSL.

The gate driver 120 may be formed together with the pixel PXL on the display 110. However, the gate driver 120 is not limited thereto. For example, the gate driver 120 may be implemented as an integrated circuit to be mounted on a circuit film, and may be connected to the timing controller 140 via at least one circuit film and a printed circuit board.

The data driver 130 may generate a data signal (or data voltage), based on image data DATA2 (or second data) and a data control signal DCS, which are provided from the timing controller 140, and may provide the generated data signal to the display 110 (or the pixel PXL) through the data line DL. The data control signal DCS is a signal for controlling an operation of the data driver 130, and may include a load signal (or data enable signal) instructing an output of a valid data signal, a horizontal start signal, a data clock signal, and the like. Also, the data driver 130 may provide the initialization voltage to the display 110 (or the pixel PXL) through the readout line RL.

For example, the data driver 130 may include a shift register for generating a sampling signal by shifting the horizontal start signal in synchronization with the data clock signal, a latch for latching the image data DATA2 in response to the sampling signal, a digital-analog converter (or decoder) for converting the latched image data (e.g., data in a digital form) into a data signal in an analog form, and a buffer (or amplifier) for outputting the data signal to the data line DL.

Also, in a separate sensing mode or sensing period (e.g., in a sensing period allocated to sensing an electrical characteristic of the pixel PXL, such as a threshold voltage and/or a mobility of a driving transistor included in the pixel PXL) the data driver 130 may provide a test signal (or test voltage) to the pixel PXL through the data line DL, and may receive a sensing signal from the pixel PXL through the readout line RL. The sensing signal may be used to compensate for an electrical characteristic (or characteristic deviation) of the pixel PXL in at least one of the data driver 130 or the timing controller 140.

In one or more embodiments, the image data DATA2 for one frame image may include two data values (or grayscale values) for the pixel PXL. For example, the image data DATA2 may include a first data value V1 and a second data value V2. The data driver 130 may generate a first data signal, based on the first data value V1, and may generate a second data signal, based on the second data value V2. In one frame period, the data driver 130 may sequentially provide the first data signal and the second data signal to the pixel PXL through the data line DL. This will be described later with reference to FIGS. 3 and 9.

The timing controller 140 may receive input image data DATA1 (or frame data) and a control signal CS from an external device (e.g., a graphic processor), may generate the scan control signal SCS and the data control signal DCS, based on the control signal CS, and may generate the image data DATA2 by converting the input image data DATA1. The control signal CS may include a vertical synchronization signal, a horizontal synchronization signal, a reference clock signal, and the like. The vertical synchronization signal indicates a start of frame data (e.g., data corresponding to a frame period in which one frame image is displayed), and the horizontal synchronization signal may indicate a start of a data row (e.g., one data row among a plurality of data rows included in the frame data). For example, the timing controller 140 may convert the input image data DATA1 into the image data DATA2 having a format corresponding to a pixel arrangement in the display 110.

In embodiments, the timing controller 140 may generate the first data value V1 and the second data value V2 based on a grayscale value GRAY (or grayscale) for the pixel PXL. The grayscale value GRAY may be included in the input image data DATA1 (or frame data), and the first data value V1 and the second data value V2 may be included in the image data DATA2.

In one or more embodiments, the timing controller 140 may decide whether the grayscale value GRAY is less than or equal to a reference grayscale value, and may generate the first data value V1 and the second data value V2 based on the decision result. The grayscale value GRAY may be included in the input image data DATA1 (or frame data), and the first data value V1 and the second data value V2 may be included in the image data DATA2.

When the grayscale value GRAY is within a range of a minimum grayscale value to a maximum grayscale value, the reference grayscale value may be greater than about $1/10^{th}$ of the maximum grayscale value, and may be less than or equal to about ½ of the maximum grayscale value. For example, when the minimum grayscale value is 0 and the maximum grayscale value is 255, the reference grayscale value may be greater than a grayscale value of about 25 and may be less than or equal to a grayscale value of about 128. For example, the reference grayscale value may be the grayscale value of 128, a grayscale value of 80, a grayscale value of 32, or the like among grayscale values of 0 to 255. When the grayscale value GRAY is greater than the reference grayscale value, this may mean that the grayscale value GRAY is a high grayscale value (or intermediate grayscale value). When the grayscale value GRAY is less than or equal to the reference grayscale value, this may mean that the grayscale value GRAY is a low grayscale value. In other words, the reference grayscale value may be a reference value for deciding whether the grayscale value GRAY is a low grayscale value (e.g., a low grayscale with which grayscale expression is difficult through current control).

For example, the first data value V1 and the second data value V2 may correspond to a grayscale value in a first period within a frame period and a grayscale value in a second period within the frame period. When the grayscale value GRAY is greater than the reference grayscale value, the timing controller 140 may generate the first data value V1 and the second data value V2, each of which is equal to the grayscale value GRAY. The pixel PXL may equally emit light in the first period and the second period.

When the grayscale value GRAY is less than or equal to the reference grayscale value, the timing controller 140 may generate the first data value V1 that is greater than the grayscale value GRAY (e.g., the first data value V1 which is two times of the grayscale value GRAY) and may generate the second data value that is less than the grayscale value GRAY (e.g., a grayscale value of 0). The pixel PXL may differently emit light in the first period and the second period, or may emit light in the first period while not emitting light in the second period. For example, the pixel PXL may emit light with a luminance (e.g., a luminance corresponding to a grayscale value greater than the grayscale value GRAY or the reference grayscale value) that is higher than a target luminance (e.g., a luminance corresponding to the grayscale value GRAY) in the first period, but may not emit light in the second period. An average luminance in both the first and second periods may be equal to the target luminance. That is, a low grayscale is expressed using an intermediate grayscale value (or high grayscale value) instead of a low grayscale value, so that the display device 100 can accurately express the low grayscale.

In another example, the first data value V1 may correspond to a grayscale value in the frame period, and the second data value V2 may indicate whether the pixel PXL does not emit light in the second period within the frame period. When the grayscale value GRA is greater than the reference grayscale value, the timing controller 140 may generate the first data value V1 equal to the grayscale value GRAY and the second data value V2 indicating light emission. When the grayscale value GRAY is less than or equal to the reference grayscale value, the timing controller 140 may generate the first data value V1 greater than the grayscale value GRAY (e.g., the first data value V1, which is two times of the grayscale value GRAY) and the second data value V2 indicating non-light emission. This will be described later with reference to FIG. 9.

In one or more embodiments, the timing controller 140 may include a first data processor and a second data processor. For example, the first data processor may be implemented as a general timing controller for generating image data having a format corresponding to the display 110 based on the vertical synchronization signal, the horizontal synchronization signal, and the input image data DATA1. For example, the second data processor may include a calculation circuit for comparing a grayscale value GRAY of the image data with the reference grayscale value and for calculating the first and second data values V1 and V2.

In embodiments, the display device 100 may further include a power supply. The power supply may supply a first power voltage and a second power voltage. The first and second power voltages may be power voltages suitable for an operation of the pixel PXL or voltages of a driving power source. Also, the power supply may provide the initialization voltage to the data driver 130. Further, the power supply may provide driving voltages (e.g., a turn-on voltage and a turn-off voltage) to at least one of the gate driver 120, the data driver 130, or the timing controller 140. The power supply may be implemented as a Power Management IC (PMIC).

Meanwhile, each of the data driver 130 and the timing controller 140 may be implemented as a separate integrated circuit, but the present disclosure is not limited thereto. For example, the data driver 130 and the timing controller 140 may be implemented into one integrated circuit. In some embodiments, at least two of the gate driver 120, the data driver 130, and the timing controller 140 may be implemented into one integrated circuit.

Figure 2:
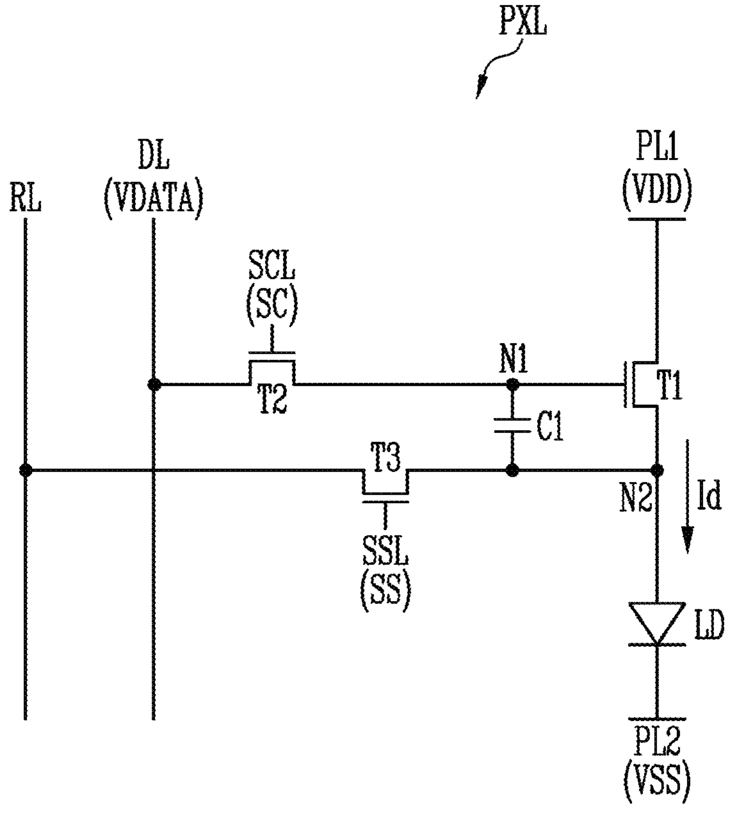
FIG. 2 is a circuit diagram illustrating one or more embodiments of a pixel included in the display device shown in FIG. 1.

FIG. 2 is a circuit diagram illustrating one or more embodiments of the pixel included in the display device shown in FIG. 1.

Referring to FIGS. 1 and 2, the pixel PXL may be electrically connected to a data line DL, a readout line RL, a scan line SCL, and a sensing scan line SSL.

The pixel PXL may include a light-emitting element LD, a first transistor T1 (driving transistor), a second transistor T2, a third transistor T3, and a first capacitor C1. Each of the first transistor T1, the second transistor T2, and the third transistor T3 may include an oxide transistor, and may be an n-type transistor. However, the present disclosure is not limited thereto. For example, each of the first transistor T1, the second transistor T2, and the third transistor T3 may include a silicon semiconductor, or may be implemented as a p-type transistor.

An anode electrode of the light-emitting element LD may be connected to a second node N2 (or a second electrode of the first transistor T1), and a cathode electrode of the light-emitting element LD may be connected to a second power line PL2 to which a second power voltage VSS is applied. In the circuit diagram, "connection" may mean electrical connection. The light-emitting element LD may emit light, corresponding to a driving current Id (or current amount) supplied from the first transistor T1. The light-emitting element LD may be an organic light-emitting diode. However, the present disclosure is not limited thereto, and the light-emitting element LD may include an inorganic light-emitting diode.

A first electrode of the first transistor T1 may be connected to a first power line PL1 to which a first power voltage VDD is applied, and the second electrode of the first transistor T1 may be connected to the second node N2 (or the anode electrode of the light-emitting element LD). A gate electrode of the first transistor T1 may be connected to a first node N1. The first transistor T1 may control the driving current Id flowing through the light-emitting element LD corresponding to a voltage of the first node N1.

A first electrode of the second transistor T2 may be connected to the data line DL, and a second electrode of the second transistor T2 may be connected to the first node N1. A gate electrode of the second transistor T2 may be connected to the scan line SCL (or first scan line). The second transistor T2 may be turned on when a scan signal SC having a turn-on voltage level is supplied to the scan line SCL. The second transistor T2 may transfer a data signal VDATA (or data voltage) from the data line DL to the first node N1. The turn-on voltage level (or gate-on voltage level) may mean a voltage level at which a transistor is turned on. For example, a turn-on voltage level of the n-type transistor may be a high level. Meanwhile, a turn-off voltage level (or gate-off voltage level) may mean a voltage level at which a transistor is turned off. For example, a turn-off voltage level of the n-type transistor may be a low level.

The first capacitor C1 may be connected or formed between the first node N1 and the second node N2 (or the anode electrode of the light-emitting element LD). The first capacitor C1 may store a voltage corresponding to the voltage of the first node N1.

The third transistor T3 may be connected between the readout line RL and the second node N2 (or the second electrode of the first transistor T1). A gate electrode of the third transistor T3 may be connected to the sensing scan line SSL. The third transistor T3 may be turned on when a sensing scans signal SS having a turn-on voltage level is supplied to the sensing scan line SSL. The third transistor T3 may connect the second node N2 and the readout line RL to each other. An initialization voltage applied to the readout line RL may be provided to the second node N2, and the pixel PXL (or the light-emitting element LD) may be initialized or reset. Alternatively, a sensing signal (e.g., a sensing voltage or a sensing current) may be provided to the readout line RL from the second node N2.

Meanwhile, the pixel PXL is not limited to the circuit structure shown in FIG. 2. In an example, the pixel PXL may omit the third transistor T3. Also, the pixel PXL may further include other circuit elements, such as a compensation transistor for compensating for a threshold voltage or the like of the first transistor T1, an initialization transistor for initializing the voltage of the first node N1, an emission control transistor for controlling a period in which the driving current Id is supplied, and/or a boosting capacitor for boosting the voltage of the first node N1.

Figure 3:
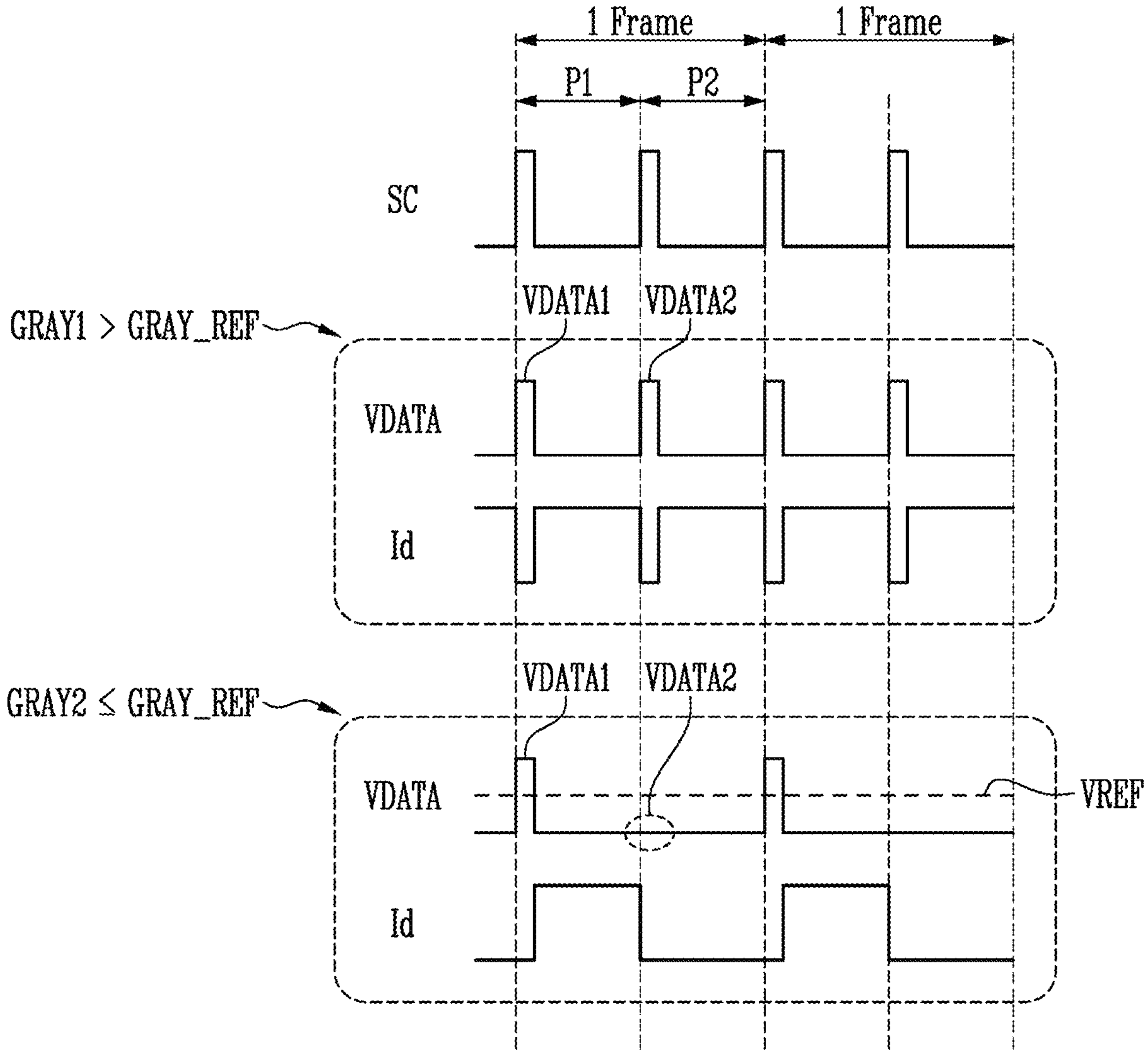
FIG. 3 is a waveform diagram illustrating an operation of the pixel shown in FIG. 2 in accordance with one or more embodiments of the present disclosure.
Figure 4:
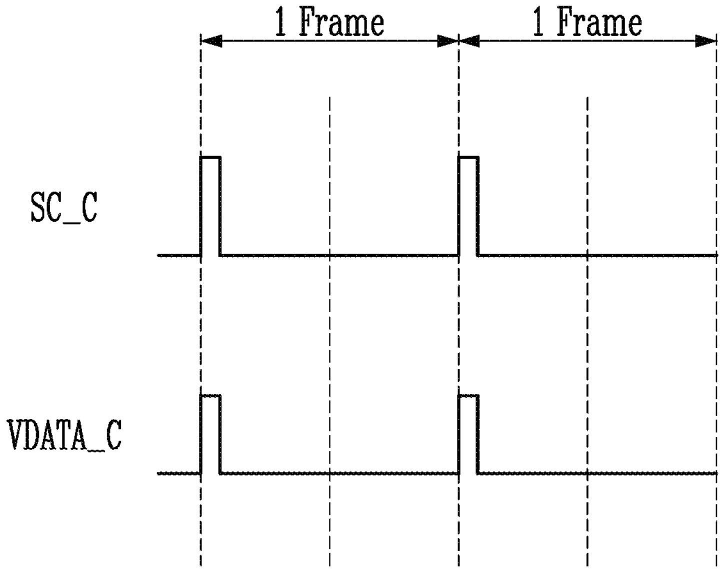
FIG. 4 is a diagram illustrating an operation of the pixel shown in FIG. 2 in accordance with a comparative example.

FIG. 3 is a waveform diagram illustrating an operation of the pixel shown in FIG. 2 in accordance with one or more embodiments of the present disclosure. In FIG. 3, signals for describing an operation of the pixel PXL in a frame period Frame (or display period) are illustrated. FIG. 4 is a diagram illustrating an operation of the pixel shown in FIG. 2 in accordance with a comparative example.

Referring to FIGS. 1 to 3, a scan signal SC may be provided to the scan line SC, and a data signal VDATA may be provided to the data line DL. The third transistor T3 may be omitted, and therefore, the sensing scan signal SS applied to the sensing scan line SSL is not particularly limited. For example, the sensing scan signal SS may be identical to the scan signal SC.

The frame period Frame may include a first period P1 and a second period P2. The first period P1 and the second period P2 do not overlap with each other. A width of the first period P1 and a width of the second period P2 may be equal to each other, or may be different from each other.

The scan signal SC may have a turn-on voltage level in each of the first period P1 and the second period P2. For example, the gate driver 120 may sequentially provide the scan signal SC having the turn-on voltage level to the display 110 in the first period P1, and may again sequentially provide the scan signal SC having the turn-on voltage level to the display 110 in the second period P2.

As shown in FIG. 4, a scan signal SC_C in accordance with the comparative example may be applied once for the pixel PXL during one frame period Frame, and a data signal VDATA_C in accordance with the comparative example may also be applied once for the pixel PXL during the one frame period Frame corresponding to the scan signal SC_C. Alternatively, the scan signal SC in accordance with the embodiments of the present disclosure may be applied twice for the pixel PXL during the one frame period Frame.

When the scan signal SC having the turn-on voltage level is applied, the data signal VDATA for the pixel PXL may be provided to the data line DL. For example, the data driver 130 may provide a first data signal VDATA1 to the pixel PXL through the data line DL at a start time of the first period P1, and may provide a second data signal VDATA2 to the pixel PXL through the data line DL at a start time of the second period P2. As described with reference to FIG. 1, the first data signal VDATA1 may be generated based on the first data value V1, and the second data signal VDATA2 may be generated based on the second data value V2.

In one or more embodiments, when a grayscale value GRAY for the pixel PXL is greater than a reference grayscale value GRAY_REF, each of the first and second data signals VDATA1 and VDATA2 may have a voltage level at which the pixel PXL emits light. Contrastingly, when the grayscale value GRAY for the pixel PXL is less than or equal to the reference grayscale value GRAY_REF, the first data signal VDATA1 may have a voltage level at which the pixel PXL emits light, and the second data signal VDATA2 may have a voltage level at which the pixel PXL does not emit light. As described above, the reference grayscale value GRAY_REF may be a reference value for deciding whether the grayscale value GRAY is a low grayscale value (e.g., a low grayscale with which grayscale expression is difficult through current control). For example, the reference grayscale value GRAY_REF may be a grayscale value of 128, a grayscale value of 80, a grayscale value of 32, or the like among grayscale values of 0 to 255.

For example, as shown in FIG. 3, with respect to a first grayscale value GRAY1 (e.g., a high grayscale value or intermediate grayscale value) that is greater than the reference grayscale value GRAY_REF, each of the first and second data signals VDATA1 and VDATA2 may have a voltage level at which the first transistor T1 is turned on. For example, each of the first and second data values V1 and V2 generated in the timing controller 140 may be equal to the first grayscale value GRAY1, and the first data signal VDATA1 according to the first data value V1 and the second data signal VDATA2 according to the second data value V2 may have the same voltage level. Accordingly, in the first period P1 and the second period P2, excluding a period in which the scan signal SC is applied, the driving current Id may flow through the pixel PXL, and the pixel PXL may emit light.

Alternatively, with respect to a second grayscale value GRAY2 (e.g., a low grayscale value) that is less than or equal to the reference grayscale value GRAY_REF, the first data signal VDATA1 may have a voltage level at which the first transistor T1 is turned on, and the second data signal VDATA2 may have a voltage level at which the first transistor T1 is turned off. For example, the first data value V1 that is generated in the timing controller 140 may be greater than the first grayscale value GRAY1, and the second data value V2 that is generated in the timing controller 140 may be equal to a minimum grayscale value (e.g., a grayscale value of 0). Accordingly, in the first period P1, the driving current Id may flow through the pixel PXL, and the pixel PXL may emit light. In the second period P2, the driving current Id may not flow through the pixel PXL, and the pixel PXL may not emit light.

Meanwhile, with respect to the entire frame period Frame, the pixel PXL is to averagely emit light with a target luminance corresponding to the second grayscale value GRAY2. Also, the pixel PXL does not emit light in the second period. Therefore, the pixel PXL may emit light with a luminance that is higher than the target luminance in the first period P1. For example, when the widths of the first period P1 and the second period P2 are the same, the pixel PXL may emit light with a luminance which is two times of the target luminance in the first period P1. To this end, the voltage level of the first data signal VDATA1 may be higher than a reference voltage level VREF (e.g., a voltage level of a data signal for emitting light with the target luminance). A range of a driving current Id for the second grayscale value GRAY2 (e.g., a low grayscale) may be substantially equal to, or may overlap with, a range of a driving current Id for the first grayscale value GRAY1 (e.g., a high grayscale or an intermediate grayscale). That is, the driving current Id for the second grayscale value GRAY2 (e.g., a low grayscale) may be a high current.

Due to dispersion of the driving current Id, a leakage current, and the like, it may be difficult to accurately express a grayscale corresponding to a driving current Id having a low intensity. Accordingly, in the present disclosure, the intensity of the driving current Id for a low grayscale value (e.g., the second grayscale value GRAY2) that is less than or equal to the reference grayscale value GRAY_REF is increased, and the emission duty (or emission time) of the pixel is decreased, thereby accurately expressing a low grayscale. In addition, because the range of the driving current ID is reduced as a low current is excluded, a color shift according to a change in the driving current Id can also be reduced or minimized.

As the second grayscale value GRAY2 is changed (e.g., increases or decreases), the voltage level of the first data signal VDATA1 may also be changed. For example, a voltage level of the first data signal VDATA1 for a second grayscale value GRAY2 of 64 may be different from a voltage level of the first data signal VDATA1 for a second grayscale value GRAY2 of 10. For example, the voltage level of the first data signal VDATA1 for the second grayscale value GRAY2 of 64 may be higher than the voltage level of the first data signal VDATA1 for a second grayscale value GRAY2 of 10.

Meanwhile, regardless of whether the second grayscale value GRAY2 is changed (e.g., increases or decreases), the width of each of the first period P1 and the second period P2 or the emission duty of the pixel PXL may be constant or fixed. For example, an emission duty for the second grayscale value GRAY2 of 64 and an emission duty for the second grayscale value GRAY2 of 10 may be the same.

As described above, the display device 100 may divide one frame period Frame into two periods (e.g., the first period P1 and the second period P2), and may provide the data signal twice (e.g., the first data signal VDATA1 and the second data signal VDATA2) to the pixel PXL. With respect to the second grayscale value GRAY2 (or low grayscale) that is less than or equal to the reference grayscale value GRAY_REF, the display device 100 may sequentially provide, to the pixel PXL, the first data signal VDATA1 having a voltage level higher than a reference voltage level VREF corresponding to the first grayscale value GRAY1, and the second data signal VDATA2 having a voltage level lower than the reference voltage level VREF, so that the pixel PXL emits light in the first period P1, and emits no light in the second period P2. The driving current Id flowing through the pixel PXL in the first period P1 may have a higher intensity corresponding to the first data signal VDATA1 (e.g., the first data signal VDATA1 having a voltage level higher than the reference voltage level VREF corresponding to the first grayscale value GRAY1). Thus, the pixel PXL and the display device 100 including the same can more accurately express a low grayscale.

Figure 5:
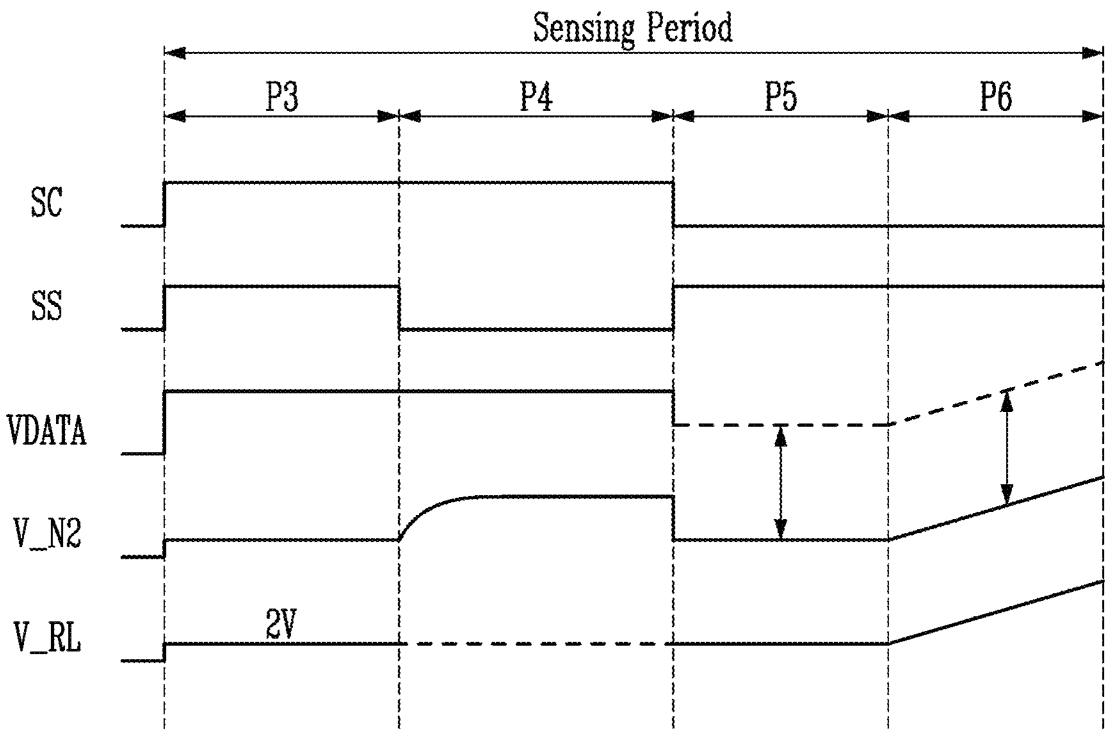
FIG. 5 is a waveform diagram illustrating an operation of the pixel shown in FIG. 2 in accordance with one or more embodiments of the present disclosure.

FIG. 5 is a waveform diagram illustrating an operation of the pixel shown in FIG. 2 in accordance with one or more embodiments of the present disclosure. In FIG. 5, signals for describing an operation of the pixel PXL in a sensing period Sensing Period are illustrated.

Referring to FIGS. 2 and 5, a scan signal SC may be provided to the scan line SCL, a sensing scan signal SS may be provided to the sensing scan line SSL, and a data signal VDATA may be provided to the data line DL. A second node voltage V_N2 may be a voltage in the second node N2, and a readout voltage V_RL may be a voltage in the readout line RL.

The sensing period is a period in which a characteristic of the pixel PX (e.g., the first transistor T1 or the light-emitting element LD) is sensed, and may be different from the frame period Frame (or display period) shown in FIG. 3. For example, the sensing period may be allocated separately from the frame period (or display period). The pixel PXL may not emit light in the sensing period.

The sensing period may include a third period P3, a fourth period P4, a fifth period P5, and a sixth period P6.

In the third period P3, the scan signal SC may have a turn-on voltage level, and the sensing scan signal SS may have the turn-on voltage level.

The second transistor T2 may be turned on in response to the scan signal SC having the turn-on voltage level, and the data signal VDATA (or test signal, e.g., about 10V) may be applied to the first node N1 through the data line DL. In addition, the third transistor T3 may be turned on in response to the sensing scan signal SS having the turn-on voltage level, and an initialization voltage (e.g., about 2V) may be applied to the second node N2 through the readout line RL. The second node voltage V_N2 may be equal to the readout voltage V_RL. The initialization voltage has a voltage level that is lower than an operating point (or threshold voltage) of the light-emitting element LD, and therefore, the light-emitting element LD may not emit light.

After that, in the fourth period P4, the sensing scan signal SS may have a turn-off voltage level. The third transistor T3 may be turned off in response to the sensing scan signal SS having the turn-off voltage level, and the second node N2 of the pixel PXL may be in a floating state.

During the fourth period P4, the first transistor T1 supplies a current to the second node N2 in response to the data signal VDATA, and therefore, the second node voltage V_N2 may be changed. For example, while a parasitic capacitance of the light-emitting element LD is charged, the second node voltage V_N2 may increase to the operating point of the light-emitting element LD, and a voltage corresponding to the operating point of the light-emitting element LD may be stored in the first capacitor C1.

After that, in the fifth period P5, the scan signal SC may have the turn-off voltage level. The second transistor T2 may be turned off, and the first node N1 may be in the floating state. A node voltage of the first node N1 may be changed by the first capacitor C1 corresponding to the second node voltage V_N2.

In the fifth period P5, the sensing scan signal SS may have the turn-on voltage level. The third transistor T3 may be turned on, and the second node N2 may be connected to the readout line RL. The readout voltage V_RL is in a state in which the readout voltage V_RL is maintained as the initialization voltage, and the second node voltage V_N2 may be changed to be equal to the readout voltage V_RL.

After that, in the sixth period P6, the initialization voltage may not be supplied to the readout line RL.

The first transistor T1 may supply, to the second node N2, a current corresponding to a gate-source voltage (or a voltage stored in the first capacitor, such as a voltage corresponding to the operating point of the light-emitting element LD), and accordingly, the second node voltage V_N2 and the readout voltage V_RL may linearly increase. Thus, information on a characteristic of the light-emitting element LD can be acquired based on the readout voltage V_RL.

Figure 6:
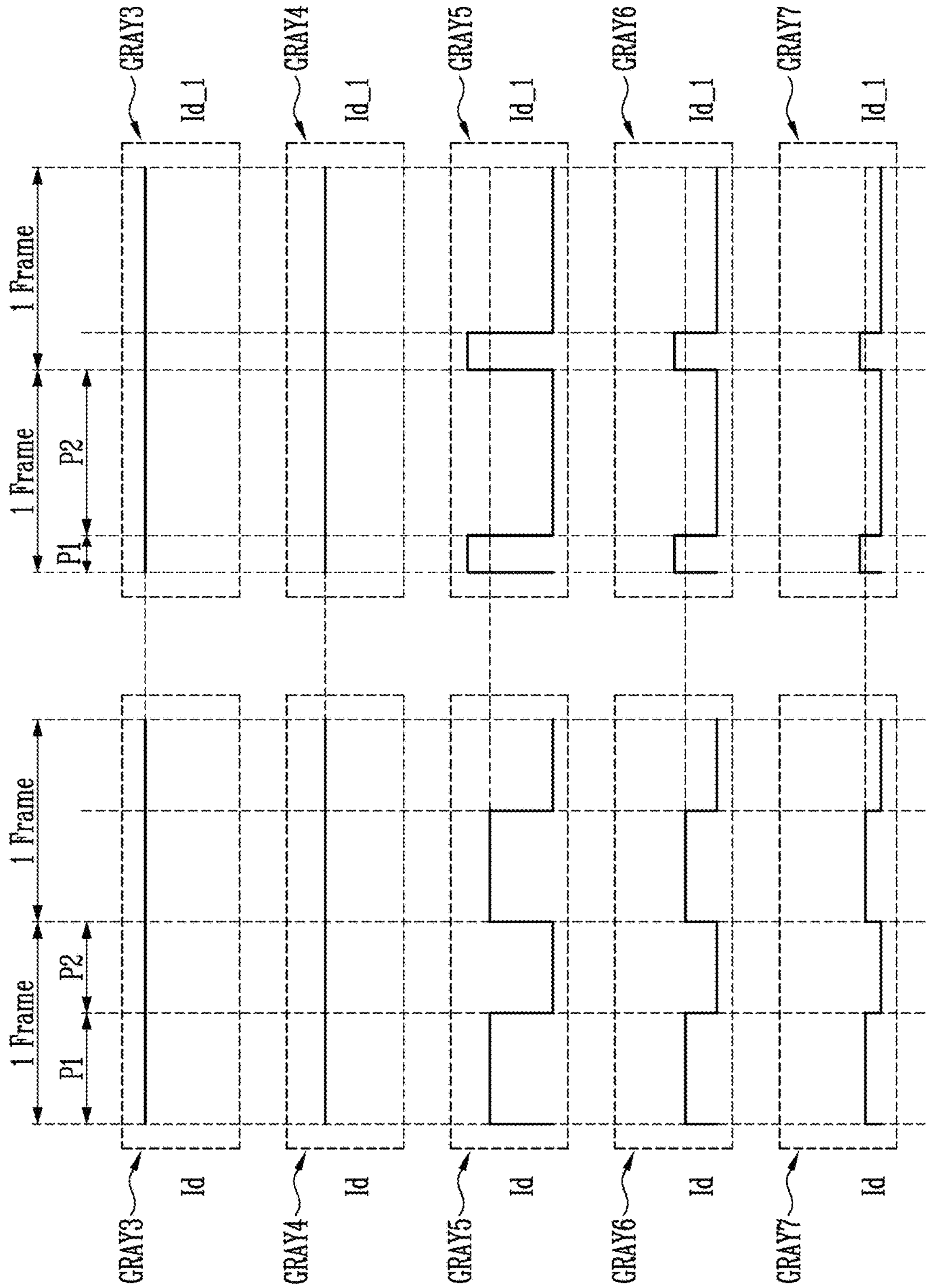
FIG. 6 is a waveform diagram illustrating an operation of the pixel shown in FIG. 2 in accordance with one or more embodiments of the present disclosure.

FIG. 6 is a waveform diagram illustrating an operation of the pixel shown in FIG. 2 in accordance with one or more embodiments of the present disclosure. In FIG. 6, a driving current Id flowing through the pixel PXL is illustrated for each grayscale. A case where a width of a first period P1 and a width of a second period P2 are substantially the same is illustrated at the left side of FIG. 6, and a case where the width of the second period P2 is greater than the width of the first period P1 is illustrated at the right side of FIG. 6.

Referring to FIGS. 2, 3, and 6, a period in which a scan signal having a turn-on voltage level is applied to the pixel PXL in one frame period Frame is very small, and therefore, for convenience of description, the period in which the scan signal SC is applied is omitted in FIG. 6.

Each of a third grayscale value GRAY3 and a fourth grayscale value GRAY4 may be greater than a reference grayscale value GRAY_REF, and each of a fifth grayscale value GRAY5, a sixth grayscale value GRAY6, and a seventh grayscale value GRAY7 may be less than or equal to the reference grayscale value GRAY_REF. For example, in a grayscale range of 0 to 255, the reference grayscale value GRAY_REF may be 128, the third grayscale value GRAY3 may be 256, the fourth grayscale value GRAY4 may be 200, the fifth grayscale value GRAY5 may be 128, the sixth grayscale value GRAY6 may be 64, and the seventh grayscale value GRAY7 may be 10.

A driving current Id or Id_1 for the third grayscale value GRAY3 or the fourth grayscale value GRAY4, which is greater than the reference grayscale value GRAY_REF, may be constant regardless of the width of the first period P1 and/or the width of the second period P2. This is because, with respect to the third grayscale value GRAY3 or the fourth grayscale value GRAY4, which is greater than the reference grayscale value GRAY_REF, the driving current Id or Id_1 flows through the pixel PXL throughout the one frame period Frame.

A driving current Id or Id_1 for the fifth grayscale value GRAY5, the sixth grayscale value GRAY6, or the seventh grayscale value GRAY7, which is less than or equal to the reference grayscale value GRAY_REF, may be increased as the width (or emission duty) of the first period P1 becomes smaller. For example, as shown in FIG. 6, a driving current Id_1 for the fifth grayscale value GRAY5 in the case where the width of the first period P1 is relatively small may be greater than a driving current Id for the fifth grayscale value GRAY5 in the case where the widths of the first and second periods P1 and P2 are the same.

Meanwhile, as shown in FIG. 6, as a grayscale value is changed (e.g., increases or decreases), the intensity of the driving current Id or Id_1 may also be changed. For example, a driving current Id or Id_1 for the seventh grayscale value GRAY7 may be less than a driving current Id or Id_1 for the sixth grayscale value GRAY6. In addition, regardless of that the grayscale value is changed (e.g., increases or decreases), the width of each of the first period P1 and the second period P2 or the emission duty of the pixel PXL may be constant or fixed. For example, an emission duty for the sixth grayscale value GRAY6 and an emission duty for the seventh grayscale value GRAY may be the same.

As described above, the driving current Id or Id_1 for a grayscale value GRAY5, GRAY6 or GRAY7, which is less than or equal to the reference grayscale value GRAY_REF, may be increased as the width (or emission duty) of the first period P1 becomes smaller. By considering this, a range of the driving current Id or Id_1 and an emission duty (a width of the first period P1 and/or the second period P2, which corresponds thereto) may be appropriately set.

Figure 7:
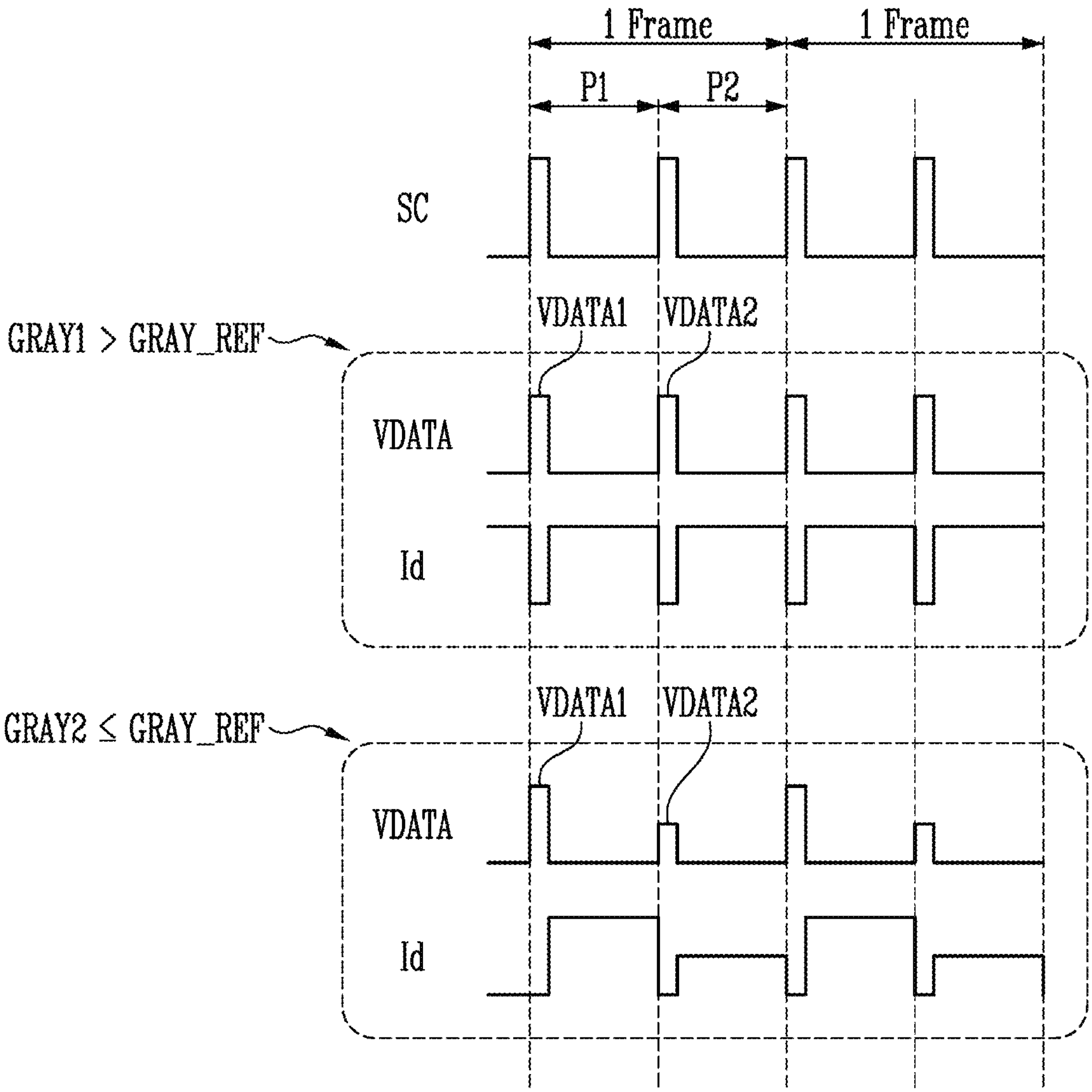
FIG. 7 is a waveform diagram illustrating an operation of the pixel shown in FIG. 2 in accordance with one or more embodiments of the present disclosure.

FIG. 7 is a waveform diagram illustrating an operation of the pixel shown in FIG. 2 in accordance with one or more embodiments of the present disclosure.

Referring to FIGS. 1 to 3 and 7, the waveform diagram shown in FIG. 7 may be substantially identical or similar to the waveform diagram shown in FIG. 3, except a second data signal VDATA2 for the second grayscale value GRAY2 (e.g., a data signal VDATA in the second period P2) and a driving current Id corresponding thereto (e.g., a driving current Id in the second period P2). Therefore, overlapping descriptions will not be repeated.

In one or more embodiments, with respect to the second grayscale value GRAY2 that is less than or equal to the reference grayscale value GRAY_REF, the first data signal VDATA1 may have a voltage level that is higher than the reference voltage level VREF, and the second data signal VDATA2 may have a voltage level that is lower than the reference voltage level VREF. Unlike the one or more embodiments corresponding to FIG. 3, the second data signal VDATA2 may have a voltage level at which the pixel PXL emits light. Accordingly, with respect to the second grayscale value GRAY2, the pixel PX may emit light with a luminance in the second period P2, which is lower than a luminance in the first period P1.

The second data signal VDATA2 may be fixed regardless of the grayscale value (or the second grayscale value GRAY2), or may vary according to the grayscale value (or the second grayscale value GRAY2). For example, the second data signal VDATA2 may be set to have a voltage level corresponding to a minimum current in a range of the driving current Id except a low current, but the present disclosure is not limited thereto. In another example, similarly to the first data signal VDATA1, the second data signal VDATA2 may be set to correspond to, or may be in proportion to, the second grayscale value GRAY2.

As described above, with respect to the second grayscale value GRAY2 (or low grayscale) that is less than or equal to the reference grayscale value GRAY_REF, the pixel PXL may emit light with a low luminance in the second period P2. Thus, a low grayscale can be relatively accurately expressed using a high current in the first period P1.

Figure 8:
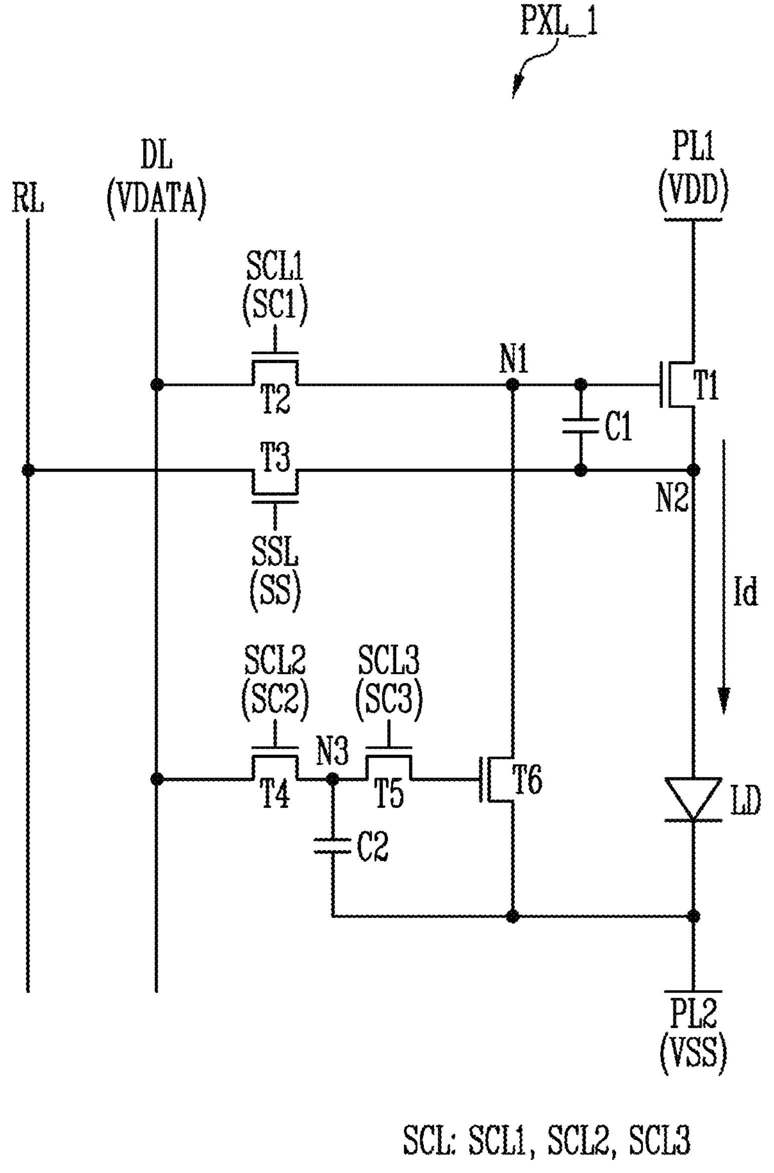
FIG. 8 is a circuit diagram illustrating one or more embodiments of the pixel included in the display device shown in FIG. 1.

FIG. 8 is a circuit diagram illustrating one or more embodiments of the pixel included in the display device shown in FIG. 1.

Referring to FIGS. 1, 2, and 8, a pixel PXL_1 may be electrically connected to a data line DL, a readout line RL, a scan line SCL, and a sensing scan line SSL1. The scan line SCL may include a first scan line SCL1, a second scan line SCL2, and a third scan line SCL3, which are different from one another. The gate electrode of the second transistor T2 may be connected to the first scan line SCL1. The gate driver 120 may apply a first scan signal SC1, a second scan signal SC2, and a third scan signal SC3 respectively to the first scan line SCL1, the second scan line SCL2, and the third scan line SCL3.

As compared with the pixel PXL shown in FIG. 2, the pixel PXL_1 shown in FIG. 8 may further include a fourth transistor T4, a second capacitor C2, a fifth transistor T5, and a sixth transistor T6. The pixel PXL_1 may adjust an emission duty, using the fourth transistor T4, the second capacitor C2, the fifth transistor T5, and the sixth transistor T6.

A first electrode of the fourth transistor T4 may be connected to the data line DL, and a second electrode of the fourth transistor T4 may be connected to a third node N3. A gate electrode of the fourth transistor T4 may be connected to the second scan line SCL2. The fourth transistor T4 may be turned on when the second scan signal SC2 having the turn-on voltage level is supplied to the second scan line SCL2. The fourth transistor T4 may transfer a data signal VDATA (or data voltage) from the data line DL to the third node N3.

The second capacitor C2 may be connected or formed between the third node N3 and the second power line PL2. The second capacitor C2 may store a voltage corresponding to a voltage of the third node N3. Although a case where one electrode of the second capacitor C2 is connected to the second power line PL2 is described, the present disclosure is not limited thereto. The one electrode of the second capacitor C2 may be connected to another constant voltage line (e.g., the first power line PL1).

A first electrode of the fifth transistor T5 may be connected to the third node N3, and a second electrode of the fifth transistor T5 may be connected to a gate electrode of the sixth transistor T6. A gate electrode of the fifth transistor T5 may be connected to the third scan line SCL3. The fifth transistor T5 may be turned on when the third scan signal SC3 having the turn-on voltage level is supplied to the third scan line SCL3. The fifth transistor T5 may electrically connect the third node N3 and the gate electrode of the sixth transistor T6 to each other.

A first electrode of the sixth transistor T6 may be connected to the first node N1, and a second electrode of the sixth transistor T6 may be connected to the second power line PL2. The gate electrode of the sixth transistor T6 may be connected to the second electrode of the fifth transistor T5. The sixth transistor T6 may electrically connect or separate the first node N1 to or from the second power line PL2, corresponding to the voltage of the third node N3.

Figure 9:
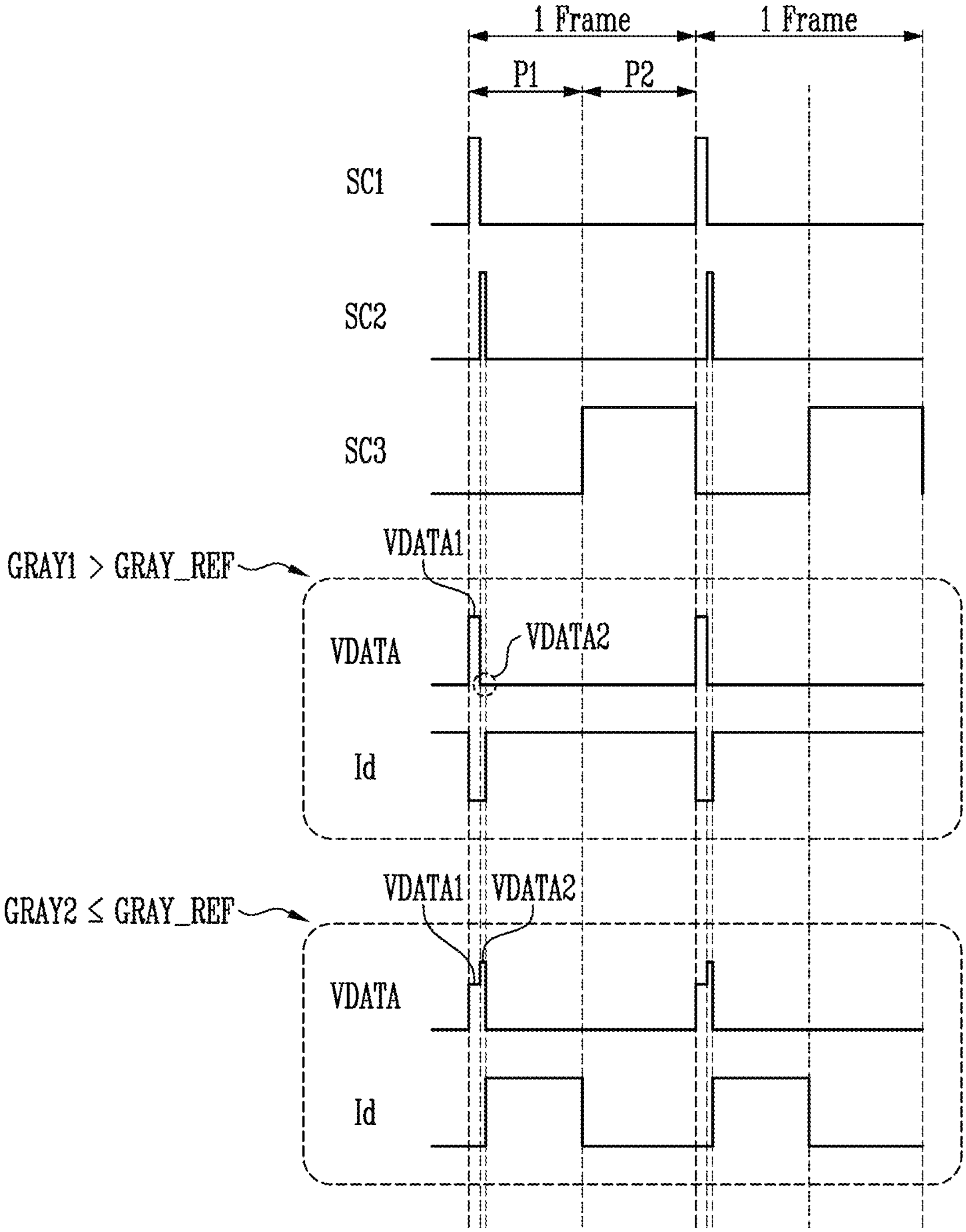
FIG. 9 is a waveform diagram illustrating an operation of the pixel shown in FIG. 8 in accordance with one or more embodiments of the present disclosure.

FIG. 9 is a waveform diagram illustrating an operation of the pixel shown in FIG. 8 in accordance with one or more embodiments of the present disclosure. In FIG. 9, signals for describing an operation of the pixel PXL_1 in a frame period Frame (or display period) are illustrated.

The frame period Frame may include a first period P1 and a second period P2. The first period P1 and the second period P2 may not overlap with each other. A width of the first period P1 and a width of the second period P2 may be equal to or different from each other (see FIG. 6).

In the first period P1, the first scan signal SC1 may have a turn-on voltage level. When the first scan signal SC1 having the turn-on voltage level is applied, a first data signal VDATA1 for the pixel PXL_1 may be provided to the data line DL. The first data signal VDATA1 may be applied to the first node N1 through the second transistor T2 turned on in response to the first scan signal SC1 having the turn-on voltage level, a driving current Id corresponding to the first data signal VDATA1 may flow through the pixel PXL_1 during the first period P1, and the pixel PXL_1 may emit light with a luminance corresponding to the driving current Id.

In the first period P1, after the first scan signal SC1 is changed to a turn-off voltage level, the second scan signal SC2 may have the turn-on voltage level. When the second scan signal SC2 having the turn-on voltage level is applied, a second data signal VDATA2 for the pixel PXL_1 may be provided to the data line DL. The second data signal VDATA2 may be applied to the third node N3 through the fourth transistor T4 turned on in response to the second scan signal SC2 having the turn-on voltage level, and a voltage corresponding to the second data signal VDATA2 may be stored in the second capacitor C2.

After that, in the second period P2, the third scan signal SC3 may have the turn-on voltage level. The width of the second period P2 may be equal to a width of the third scan signal SC3 having the turn-on voltage level. That is, the second period P2 may be defined as a period in which the third scan signal SC3 having the turn-on voltage level is applied.

A voltage of the third node N3 (or a voltage stored in the second capacitor C2) may be provided to the gate electrode of the sixth transistor T6 through the fifth transistor T5 turned on in response to the third scan signal SC3 having the turn-on voltage level, and the sixth transistor T6 may be turned on or turned off in response to the voltage. When the sixth transistor T6 is turned off, a voltage of the first node N1 is not changed, and the pixel PXL_1 may emit light in the second period P2 identically to the first period P1. Alternatively, when the sixth transistor T6 is turned on, the first node N1 may be connected to the second power line PL2, the first transistor T1 may be turned off by the second power voltage VSS of the second power line PL2, and the pixel PXL_1 may not emit light in the second period P2. That is, the second data signal VDATA2 stored in the second capacitor C2 indicates whether the pixel PXL_1 does not emit light in the second period P2. When the second data signal VDATA2 has the turn-off voltage level, the pixel PXL_1 may emit light. When the second data signal VDATA2 has the turn-on voltage level, the pixel PXL_1 may not emit light. The turn-on voltage level may be higher than the voltage level of the first data signal VDATA1.

In one or more embodiments, when a grayscale value GRAY for the pixel PXL_1 is greater than the reference grayscale value GRAY_REF, the second data signal VDATA2 may have the turn-off voltage level. For example, with respect to a first grayscale value GRAY1 that is greater than the reference grayscale value GRAY_REF, the second data signal VDATA2 may have the turn-off voltage level. The pixel PXL_1 may equally emit light in the first period P1 and the second period P2. To this end, a first value (see FIG. 1) as a basis for generating the first data signal VDATA1 may be equal to the first grayscale value GRAY1. The first data signal VDATA1 may be set to vary according to the first grayscale value GRAY1 (or grayscale value).

In one or more embodiments, when the grayscale value GRAY for the pixel PXL_1 is less than or equal to the reference grayscale value GRAY_REF, the second data signal VDATA2 may have the turn-on voltage level. For example, with respect to a second grayscale value GRAY2 that is less than or equal to the reference grayscale value GRAY_REF, the second data signal VDATA2 may have the turn-on voltage level. The pixel PXL_1 may not emit light in the second period P2. Because the pixel PXL_1 emits light in the first period P1, the driving current Id in the first period P1 may be set as a relatively high current, and the first value V1 (see FIG. 1), as the basis for generating the first data signal VDATA1, may be greater than the second grayscale value GRAY2.

The intensity of the driving current ID for the second grayscale value GRAY2 that is less than or equal to a low grayscale value (e.g., the reference grayscale value GRAY_REF) is increased, and the emission duty (or emission time) of the pixel is decreased, so that a low grayscale can be accurately expressed.

Meanwhile, the operation of the pixel PXL_1 in the sensing period may be the same as described with reference to FIG. 5. In other words, the one or more embodiments corresponding to FIG. 5 may be applied to the pixel PXL_1 shown in FIG. 8.

In the display device in accordance with the present disclosure, one frame period may be divided into two periods (e.g., a first period P1 and a second period P2), and a data signal may be provided twice to a pixel (e.g., a first data signal and a second data signal may be provided to the pixel). With respect to a grayscale value that is less than a reference grayscale value (e.g., with respect to a low grayscale), the pixel may emit light based on a high current corresponding to the first data signal in the first period, and may not emit light corresponding to the second data signal in the second period. Thus, a low grayscale can be accurately expressed using a high current instead of a low current.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A display device comprising:

a pixel comprising a light-emitting element; and a data driver configured to sequentially provide a first data signal and a second data signal to the pixel in a frame period comprising a first period, and a second period occurring after the first period, wherein the pixel is configured to emit light during the first period based on the first data signal, and to emit light during the second period based on the second data signal, wherein, when a grayscale value for the pixel is greater than a reference grayscale value, the pixel is configured to equally emit light in the first period and the second period, and wherein, when the grayscale value is less than or equal to the reference grayscale value, the pixel is configured to emit light differently in the first period compared to the second period, or to emit light in the first period while not emitting light in the second period.

2. The display device of claim 1, further comprising a controller configured to generate a first data value and a second data value based on the grayscale value of frame data, wherein the data driver is configured to generate the first data signal based on the first data value, and to generate the second data signal based on the second data value.

3. The display device of claim 2, wherein, when the grayscale value is greater than the reference grayscale value, each of the first data value and the second data value is equal to the grayscale value, and wherein, when the grayscale value is less than or equal to the reference grayscale value, the first data value is greater than the grayscale value, and the second data value is less than the grayscale value.

4. The display device of claim 1, wherein, when the grayscale value is less than or equal to the reference grayscale value, the pixel is configured to emit light with a luminance that is higher than a target luminance corresponding to the grayscale value in the first period, while not emitting light in the second period.

5. The display device of claim 1, wherein, when the grayscale value is less than or equal to the reference grayscale value, the pixel is configured to emit light with a luminance in the second period that is lower than a luminance in the first period.

6. The display device of claim 1, wherein a width of the first period is equal to a width of the second period.

7. The display device of claim 1, wherein a width of the second period is greater than a width of the first period.

8. The display device of claim 1, wherein the data driver is configured to provide the first data signal to the pixel at a start time of the first period, and to provide the second data signal to the pixel at a start time of the second period.

9. The display device of claim 1, wherein the pixel further comprises:

a first transistor comprising a first electrode electrically connected to a first power line, and a second electrode electrically connected to the light-emitting element;

a second transistor electrically connected between a data line and a gate electrode of the first transistor, and comprising a gate electrode connected to a first scan line; and a first capacitor electrically connected between the gate electrode of the first transistor and the second electrode of the first transistor, and wherein the data line is configured to receive the first data signal and the second data signal.

10. The display device of claim 9, wherein the pixel further comprises a third transistor electrically connected between a readout line and the second electrode of the first transistor.

11. A display device comprising:

a pixel comprising:

a light-emitting element;

a first transistor comprising a first electrode electrically connected to a first power line, and a second electrode electrically connected to the light-emitting element;

a second transistor electrically connected between a data line and a gate electrode of the first transistor, and comprising a gate electrode connected to a first scan line;

a first capacitor electrically connected between the gate electrode of the first transistor and the second electrode of the first transistor:

a sixth transistor electrically connected between the gate electrode of the first transistor and a second power line;

a fourth transistor electrically connected between the data line and an intermediate node, and comprising a gate electrode electrically connected to a second scan line;

a fifth transistor electrically connected between the intermediate node and a gate electrode of the sixth transistor, and comprising a gate electrode electrically connected to a third scan line; and a second capacitor electrically connected between the intermediate node and the second power line; and a data driver configured to sequentially provide a first data signal and a second data signal to the pixel in a frame period comprising a first period and a second period, wherein the pixel is configured to emit light during the first period based on the first data signal, and to emit light during the second period based on the second data signal, wherein, when a grayscale value for the pixel is greater than a reference grayscale value, the pixel is configured to equally emit light in the first period and the second period, wherein, when the grayscale value is less than or equal to the reference grayscale value, the pixel is configured to emit light differently in the first period compared to the second period, or to emit light in the first period while not emitting light in the second period, wherein the data line is configured to receive the first data signal and the second data signal, wherein the light-emitting element is electrically connected between the first transistor and the second power line, and wherein the first scan line, the second scan line, and the third scan line are different from one another.

12. The display device of claim 11, further comprising a gate driver connected to the first scan line, the second scan line, and the third scan line, configured to apply a first scan signal having a turn-on voltage level to the first scan line, and a second scan signal having the turn-on voltage level to the second scan line, in the first period, and configured to apply a third scan signal having the turn-on voltage level to the third scan line in the second period, and wherein the data driver is configured to provide the first data signal to the pixel at a time corresponding to the first scan signal, and to provide the second data signal to the pixel at a time corresponding to the second scan signal.

13. The display device of claim 12, wherein the third scan signal having the turn-on voltage level is applied during an entirety of the second period.

14. The display device of claim 12, wherein, when the grayscale value is greater than the reference grayscale value, the second data signal has a gate-off voltage level, and wherein, when the grayscale value is less than or equal to the reference grayscale value, the second data signal has the turn-on voltage level.

15. The display device of claim 14, wherein, when the grayscale value is less than or equal to the reference grayscale value, the pixel is configured not to emit light in the second period.

16. A display device comprising:

a pixel comprising a light-emitting element; and a data driver configured to sequentially provide a first data signal and a second data signal to the pixel in a frame period comprising a first period and a second period, wherein the pixel is configured to emit light during the first period based on the first data signal, and to emit light during the second period based on the second data signal, wherein, when a grayscale value for the pixel is greater than a reference grayscale value, the pixel is configured to equally emit light in the first period and the second period, wherein, when the grayscale value is less than or equal to the reference grayscale value, the pixel is configured to emit light differently in the first period compared to the second period, or to emit light in the first period while not emitting light in the second period, wherein the grayscale value is within a range of a minimum grayscale value to a maximum grayscale value, and wherein the reference grayscale value is greater than about $1/10^{th}$ of the maximum grayscale value and is less than or equal to about ½ of the maximum grayscale value.

* * * * *